US008113186B2

(12) United States Patent
Tsunooka et al.

(10) Patent No.: US 8,113,186 B2
(45) Date of Patent: Feb. 14, 2012

(54) MULTIFUEL INTERNAL COMBUSTION ENGINE

(75) Inventors: Takashi Tsunooka, Gotenba (JP); Takashi Watanabe, Susono (JP); Yohei Hosokawa, Susono (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 358 days.

(21) Appl. No.: 12/527,650

(22) PCT Filed: Feb. 4, 2008

(86) PCT No.: PCT/JP2008/051742
§ 371 (c)(1),
(2), (4) Date: Aug. 18, 2009

(87) PCT Pub. No.: WO2008/102633
PCT Pub. Date: Aug. 28, 2008

(65) Prior Publication Data
US 2010/0083937 A1 Apr. 8, 2010

(30) Foreign Application Priority Data

Feb. 19, 2007 (JP) .................................. 2007-038433

(51) Int. Cl.
*F02D 41/14* (2006.01)
*F02M 33/02* (2006.01)
*F02M 7/00* (2006.01)
*G06F 19/00* (2011.01)

(52) U.S. Cl. ......... 123/698; 123/520; 123/525; 701/104

(58) Field of Classification Search .................. 123/1 A, 123/27 A, 27 GE, 299, 300, 304, 435, 516, 123/518, 520, 575, 698, 525; 701/103–105, 701/109
See application file for complete search history.

(56) References Cited

U.S. PATENT DOCUMENTS

| 5,299,546 A | * | 4/1994 | Kato et al. ..................... 123/520 |
| 5,343,699 A | * | 9/1994 | McAlister ........................ 60/273 |
| 6,234,153 B1 | * | 5/2001 | DeGroot et al. .............. 123/525 |
| 6,374,783 B1 | * | 4/2002 | Toriumi ..................... 123/90.11 |
| 6,739,320 B2 | | 5/2004 | Ito et al. |

(Continued)

FOREIGN PATENT DOCUMENTS

JP          01-106971 A      4/1989

(Continued)

*Primary Examiner* — Willis Wolfe, Jr.
*Assistant Examiner* — Johnny Hoang
(74) *Attorney, Agent, or Firm* — Sughrue Mion, PLLC

(57) ABSTRACT

A multifuel internal combustion engine in which single low boiling point component fuel and at least one kind of fuel having properties different from those of the single low boiling point component fuel are introduced into a combustion chamber CC separately or together thereby operating the multifuel internal combustion engine, includes lubricant-oil temperature detecting unit means (temperature sensor 91) that detects a temperature of lubricant oil, or lubricant-oil temperature estimating unit means that estimates the temperature, and purge control unit means (electronic control unit 1) that prohibits purge control by an evaporation gas purge apparatus (evaporation gas passage 42, check valve 43, canister 44, on-off valve 45) or reduces a purge flow rate of evaporation gas in the purge control, when the detected or estimated temperature of the lubricant oil is near a boiling point temperature of the single low boiling point component fuel at which it is necessary to reduce a fuel injection amount from a fuel injection valve to a predetermined amount or less to adjust an air/fuel ratio of the combustion chamber to a target air/fuel ratio.

3 Claims, 5 Drawing Sheets

U.S. PATENT DOCUMENTS

| | | | |
|---|---|---|---|
| 6,868,837 B2 * | 3/2005 | Ament | 123/520 |
| 6,966,304 B2 | 11/2005 | Nagaishi et al. | |
| 7,461,637 B2 * | 12/2008 | Yamashita et al. | 123/468 |
| 7,774,128 B2 * | 8/2010 | Kim | 701/109 |
| 2004/0112331 A1 * | 6/2004 | Miura | 123/346 |
| 2005/0092283 A1 * | 5/2005 | Eguchi et al. | 123/196 M |
| 2005/0211229 A1 * | 9/2005 | Pellizzari et al. | 123/525 |
| 2007/0156322 A1 * | 7/2007 | Soga et al. | 701/104 |

FOREIGN PATENT DOCUMENTS

| | | |
|---|---|---|
| JP | 04-136469 A | 5/1992 |
| JP | 04-308336 A | 10/1992 |
| JP | 05-099083 A | 4/1993 |
| JP | 06-081730 A | 3/1994 |
| JP | 2003-322052 A | 11/2003 |
| JP | 2004-197591 A | 7/2004 |

\* cited by examiner

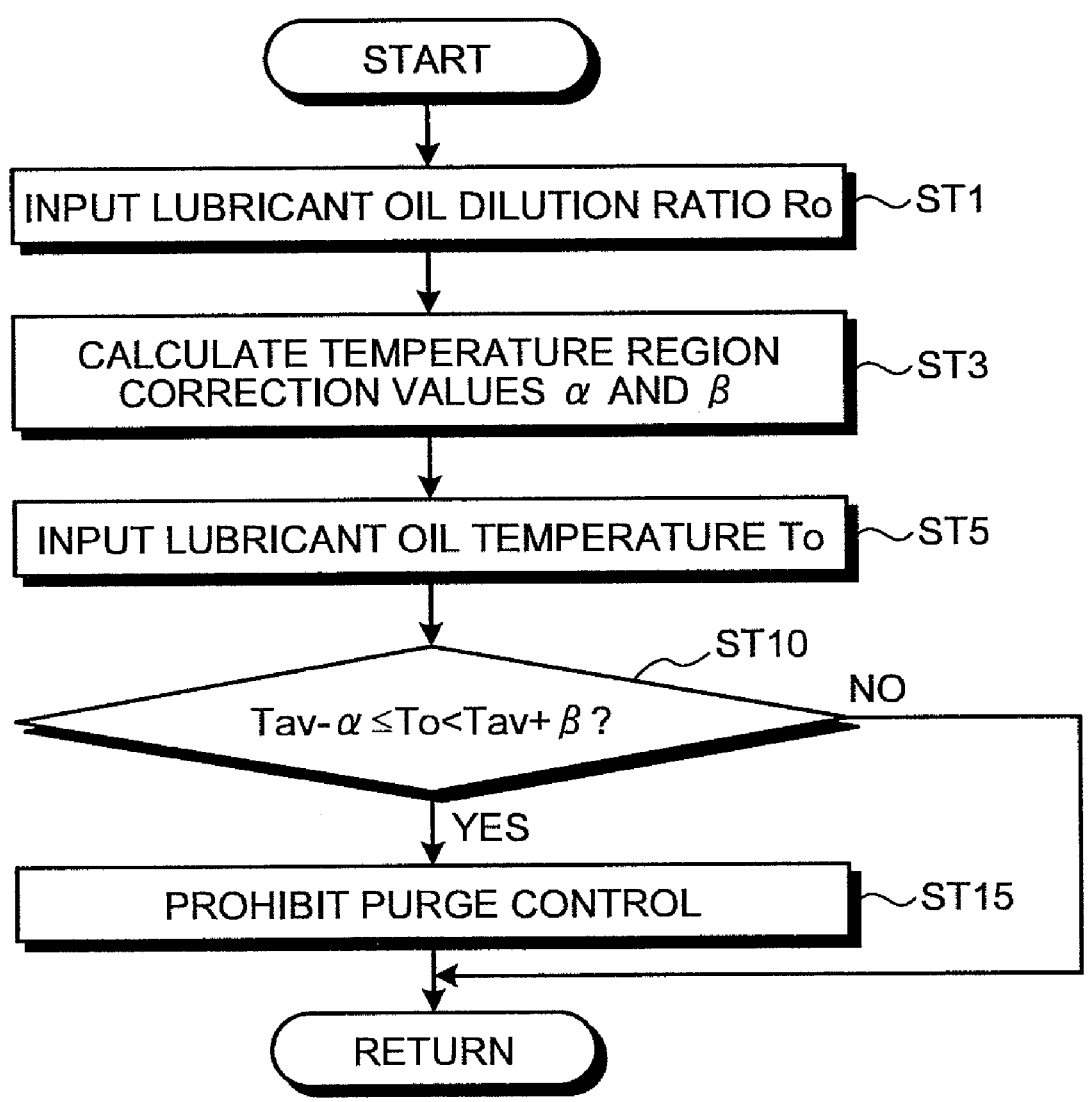

MULTIFUEL INTERNAL COMBUSTION ENGINE

TECHNICAL FIELD

The present invention relates to a multifuel internal combustion engine which is operated using single low boiling point component fuel such as alcohol fuel and at least one kind of fuel having different properties from those of the single low boiling point component fuel.

BACKGROUND ART

Usually, fuel stored in a fuel tank is evaporated and fuel evaporation gas is produced. Generally, the fuel tank is tightly closed, and an internal pressure is increased as the evaporation gas is increased. Therefore, if the pressure is not released outside, there is a possibility that the tank is broken. However, for example, if gasoline fuel is evaporated, since harmful hydrocarbon (HC) component is included, such gas should not be released to the atmosphere in terms of environmental performance. Hence, in a conventional internal combustion engine, there is prepared an evaporation gas purge apparatus in which the evaporation gas is adsorbed by activated carbon in a canister, and the evaporation gas is introduced (purge controlled) into an intake system together with new gas by suction negative pressure of the engine. For example, the following Patent Documents 1 to 4 disclose various modes of purge control of the evaporation gas purge apparatus.

The Patent Document 1 describes purge control in which if fuel is light fuel in which evaporation gas is increased, a purge flow rate of the evaporation gas is reduced, and if fuel is heavy fuel in which evaporation gas is reduced, the evaporation gas is positively purged. The Patent Document 2 describes purge control in which the heavier the fuel is, the more the purge flow rate of evaporation gas is suppressed.

Here, when fuel is alcohol-mixed fuel, an evaporation degree is varied in accordance with alcohol concentration (mixed ratio of alcohol fuel) in the fuel tank. Therefore, an air/fuel ratio in the combustion chamber is deviated from a target air/fuel ratio at the time of purge control, and engine output performance and exhaust emission performance are deteriorated. Therefore, when fuel is alcohol-mixed fuel, it is preferable that a purge flow rate of the evaporation gas is adjusted in accordance with alcohol concentration in the fuel tank as described in the Patent Documents 3 and 4. A technique of the Patent Document 3 is constituted such that purge control is performed based on the alcohol concentration in the fuel tank and the evaporation degree of the alcohol-mixed fuel.

Patent Document 1: Japanese Patent Application Laid-open No. H4-136469
Patent Document 2: Japanese Patent Application Laid-open No. H6-81730
Patent Document 3: Japanese Patent Application Laid-open No. H1-106971
Patent Document 4: Japanese Patent Application Laid-open No. H5-99083

DISCLOSURE OF INVENTION

Problem to be Solved by the Invention

A portion of alcohol-mixed fuel sent to a combustion chamber adheres to a cylinder bore wall surface, the portion of the alcohol-mixed fuel is scrapped down together with lubricant oil by a piston ring, and stored in an oil pan. That is, lubricant oil in the oil pan is diluted with alcohol-mixed fuel. Generally, a single low boiling point component fuel such as alcohol fuel has a low boiling point, and a temperature thereof reaches the boiling point, the single low boiling point component fuel is evaporated at a dash. Thus, since it is highly likely that a temperature of the lubricant oil exceeds a boiling point of the single low boiling point component fuel, the single low boiling point component (such as alcohol component) diluted with lubricant oil is evaporated at a time and flow into the combustion chamber from a gap between the cylinder bore wall surface and the piston ring. Therefore, even if the purge control is executed in accordance with the alcohol concentration in the fuel tank as in the Patent Documents 3 and 4, the actual air/fuel ratio in the combustion chamber becomes denser (richer) than the target air/fuel ratio by the single low boiling point component which flowed in some cases. In such a case, there is an adverse possibility that the emission performance and drivability are deteriorated.

An injection amount of a fuel injection valve may be suppressed in accordance with an amount of the single low boiling point component flowing into the combustion chamber. However, there is a limitation in reduction of the injection amount, and even if the injection amount is reduced to the minimum injection amount of the fuel injection valve, if single low boiling point component more than the reduction amount flows into the combustion chamber, the actual air/fuel ratio in the combustion chamber becomes denser (richer) than the target air/fuel ratio, and there is high probability that deterioration of emission performance cannot be suppressed.

It is an object of the present invention to provide a multifuel internal combustion engine capable of controlling an air/fuel ratio in a combustion chamber to an appropriate value and realizing excellent driving even if single low boiling point component fuel is used.

Means for Solving Problem

According to one aspect of the present invention, a multifuel internal combustion engine in which single low boiling point component fuel and at least one kind of fuel having properties different from those of the single low boiling point component fuel are introduced into a combustion chamber separately or together thereby operating the multifuel internal combustion engine, includes lubricant-oil temperature detecting unit that detects a temperature of lubricant oil, or lubricant-oil temperature estimating unit that estimates the temperature; and purge control unit that prohibits purge control by an evaporation gas purge apparatus or reduces a purge flow rate of evaporation gas in the purge control, when the detected or estimated temperature of the lubricant oil is near a boiling point temperature of the single low boiling point component fuel at which it is necessary to reduce a fuel injection amount from a fuel injection valve to a predetermined amount or less to adjust an air/fuel ratio of the combustion chamber to a target air/fuel ratio.

In the multifuel internal combustion engine, the purge control is prohibited or the purge flow rate is reduced when the evaporated single low boiling point component fuel evaporated from the lubricant oil is supplied into the combustion chamber. Therefore, the actual air/fuel ratio in the combustion chamber that may adversely be denser (richer) by the evaporated single low boiling point component fuel can be controlled to the target air/fuel ratio.

The multifuel internal combustion engine may further include lubricant-oil dilution ratio detecting unit that detects a lubricant-oil dilution ratio of the lubricant oil by the single low boiling point component fuel, or lubricant-oil dilution ratio estimating unit that estimates the lubricant-oil dilution ratio, wherein the purge control unit may prohibit the purge control in accordance with the detected or estimated lubricant-oil dilution ratio, or may change a reducing degree of a purge flow rate of evaporation gas in the purge control in accordance with the lubricant-oil dilution ratio.

In the multifuel internal combustion engine, the purge control unit may prohibit the purge control as the lubricant-oil dilution ratio is higher, or may increase a reducing degree of the purge flow rate of the evaporation gas in the purge control as the lubricant-oil dilution ratio is higher.

Therefore, in the multifuel internal combustion engine, if the amount of single low boiling point component fuel mixed in the lubricant oil in the oil pan is small, it is possible to control purge and to secure the purge flow rate as in the conventional technique. With this, in the multifuel internal combustion engine at that time, the actual air/fuel ratio in the combustion chamber that may adversely be leaner by the prohibition of purge control or reduction of the purge flow rate can be controlled to the target air/fuel ratio. In the multifuel internal combustion engine, the amount of the single low boiling point component fuel mixed in the lubricant oil in the oil pan is high, and the purge control is prohibited or the purge flow rate is reduced when the single low boiling point component fuel evaporated in the lubricant oil is supplied into the combustion chamber. With this, in the multifuel internal combustion engine, the actual air/fuel ratio in the combustion chamber that may adversely be denser (richer) by the evaporated single low boiling point component fuel can be controlled to the target air/fuel ratio.

EFFECT OF THE INVENTION

In the multifuel internal combustion engine according to the present invention, even if the single low boiling point component fuel evaporated from the lubricant oil in the oil pan is supplied into the combustion chamber, the actual air/fuel ratio in the combustion chamber can be controlled to the target air/fuel ratio suitable for the driving condition. Therefore, according to this multifuel internal combustion engine, it is possible to suppress the deterioration in exhaust emission performance and drivability without being influenced by the evaporated single low boiling point component fuel, and the engine can be driven excellently in accordance with a driving condition.

BRIEF DESCRIPTION OF DRAWINGS

FIG. 6 is a flowchart used for explaining purge control prohibiting operation of the multifuel internal combustion engine in the third embodiment.

Figure 1:
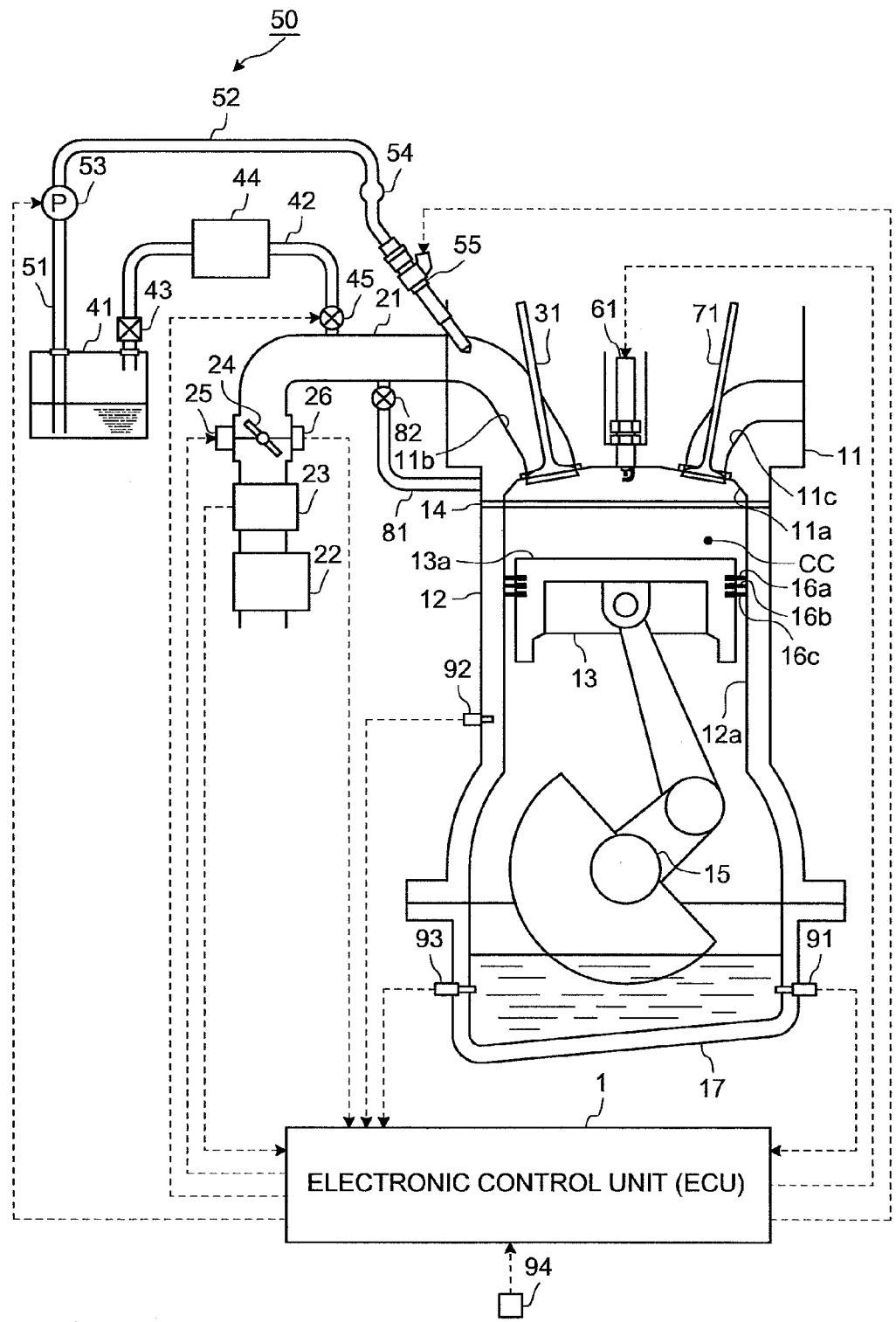
FIG. 1 is a diagram illustrating one example of a structure of a multifuel internal combustion engine according to the present invention.

EXPLANATIONS OF LETTERS OR NUMERALS 1 electronic control unit
11b intake port
17 oil pan
41 fuel tank
42 evaporation gas passage
43 check valve
44 canister
45 on-off valve
50 fuel supply device
55 fuel injection valve
81 blow-by gas passage
82 blow-by gas control valve
91 temperature sensor (lubricant-oil temperature detecting unit)
92 water temperature sensor
93 alcohol concentration sensor (lubricant-oil dilution ratio detecting unit)
94 exhaust sensor
CC combustion chamber
Ra predetermined value
Ro lubricant-oil dilution ratio
Tav boiling point temperature of alcohol fuel
To temperature of lubricant oil
$\alpha, \beta$ temperature region correction value

BEST MODE(S) FOR CARRYING OUT THE INVENTION

Embodiments of a multifuel internal combustion engine according to the present invention will be explained in detail based on the drawings. The invention is not limited by the embodiments.

First Embodiment

Figure 2:
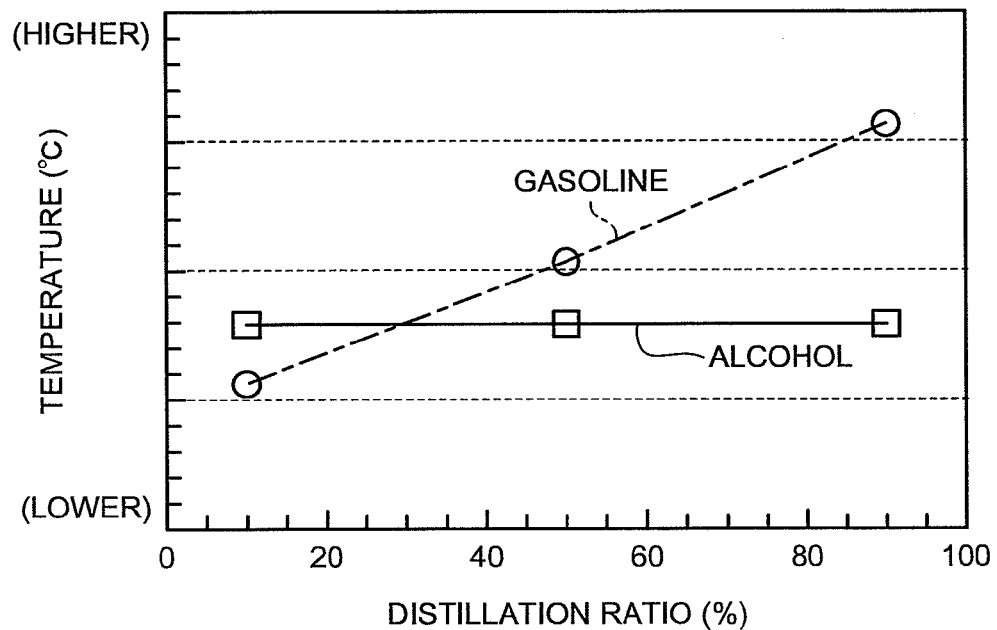
FIG. 2 is a diagram illustrating a relation between temperatures of gasoline fuel and alcohol fuel mixed in lubricant oil, and a distillation ratio of the gasoline fuel and alcohol fuel from the lubricant oil.
Figure 3:
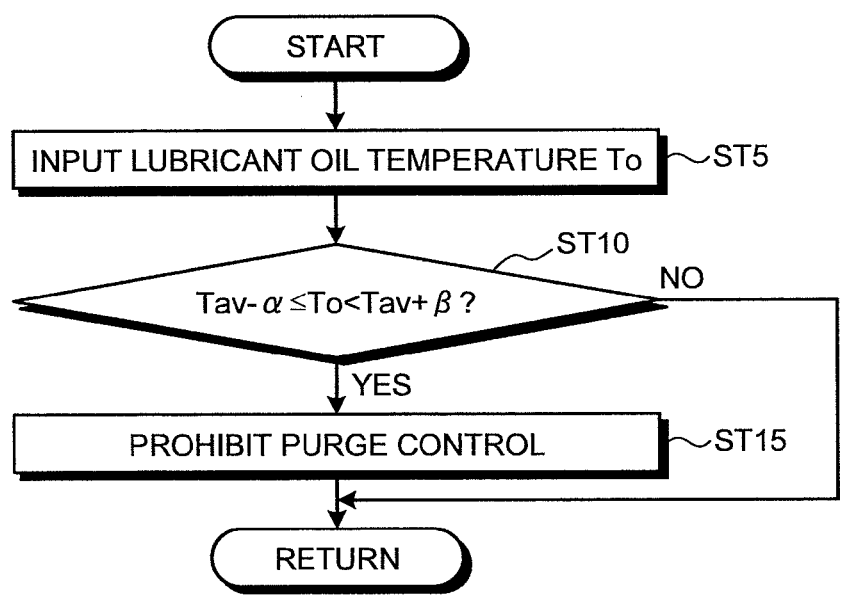
FIG. 3 is a flowchart used for explaining purge control prohibiting operation of the multifuel internal combustion engine in a first embodiment.

A first embodiment of the multifuel internal combustion engine according to the present invention will be explained based on FIGS. 1 to 3. In the multifuel internal combustion engine of the first embodiment, mixed fuel of single low boiling point component fuel and at least one kind of fuel having different properties from those of the single low boiling point component fuel is stored in one fuel tank, and the internal combustion engine is driven using the mixed fuel. Various control operations such as a fuel control and the like are executed by an electronic control unit (ECU) 1. The electronic control unit 1 includes a CUP (Central Processing Unit) (not shown), a ROM (Read Only Memory) in which a predetermined control program and the like are stored, a RAM (Random Access Memory) in which a calculation result of the CPU is temporarily stored, and a backup RAM in which previously prepared information and the like are stored. The single low boiling point component fuel is a single component fuel having relative low boiling point. A typical example of the single low boiling point component fuel is alcohol fuel having low boiling point having a single component such as ethanol, methanol and the like.

A structure of the multifuel internal combustion engine will first be explained based on FIG. 1. Although only one cylinder is shown in FIG. 1, the present invention is not limited to this, and the invention can also be applied to a multi-cylinder multifuel internal combustion engine. It is assumed that, in the first embodiment, the engine has a plurality of cylinders.

The multifuel internal combustion engine includes a cylinder head 11, a cylinder block 12 and a piston 13 forming a combustion chamber CC. The cylinder head 11 and the cylinder block 12 are connected to each other by means of a bolt or the like through a head gasket 14 shown in FIG. 1. The piston 13 is disposed in a space formed between a recess 11a in a lower surface of the cylinder head 11 formed by this and a cylinder bore 12a of the cylinder block 12 such that the piston 13 can reciprocate. The combustion chamber CC is formed by a space surrounded by a wall surface of the recess 11a of the cylinder head 11, a wall surface of the cylinder bore 12a and a top surface 13a of the piston 13.

According to the multifuel internal combustion engine of the first embodiment, air and mixed fuel are sent into the combustion chamber CC in accordance with driving conditions such as the number of revolutions of the engine and an engine load and the like, and combustion control suitable for the driving condition is executed. The air is sucked from outside through an intake passage 21 and an intake port 11b of the cylinder head 11 shown in FIG. 1. The mixed fuel is supplied using a fuel supply device 50 shown in FIG. 1.

First, an air supply path will be explained. An air cleaner 22 which removes foreign matter included in air introduced outside and an airflow meter 23 which detect intake air amount from outside are provided above the intake passage 21 in the first embodiment. In the multifuel internal combustion engine, a detection signal of the airflow meter 23 is sent to the electronic control unit 1, and the electronic control unit 1 calculates the intake air amount, the engine load and the like based on the detection signal.

A throttle valve 24 which adjusts the intake air amount into the combustion chamber CC and a throttle valve actuator 25 which opens and closes the throttle valve 24 are provided downstream of the airflow meter 23 located above the intake passage 21. Intake air control means of the electronic control unit 1 of the first embodiment controls the throttle valve actuator 25 in accordance with the driving condition, and adjusts the valve opening angle of the throttle valve 24 such that a valve opening (i.e., intake air amount) suitable for the driving condition is obtained. For example, the throttle valve 24 is adjusted such that air of an intake air amount necessary for achieving the air/fuel ratio suitable for the driving condition is sucked. The multifuel internal combustion engine is provided with a throttle opening sensor 26 which detects a valve opening degree of the throttle valve 24 and which sends its detection signal to the electronic control unit 1.

One end of the intake port 11b is opened toward the combustion chamber CC, and an intake valve 31 which opens and closes the opening is disposed at the opening. The number of the openings may be one or more, and each opening is provided with the intake valve 31. Therefore, in the multifuel internal combustion engine, air is sucked into the combustion chamber CC from the intake port 11b by opening the intake valve 31, and air flow into the combustion chamber CC is blocked by closing the intake valve 31.

An example of the intake valve 31 is a valve which is opened and closed by rotation of an intake-side cam shaft (not shown) and an elastic force of an elastic member (helical spring). In the intake valve 31 of this kind, a power transmission mechanism including a chain, a sprocket or the like is interposed between the intake-side cam shaft and a crankshaft 15 so that the intake-side cam shaft is operated in association with rotation of the crankshaft 15, and the intake valve 31 is opened and closed at preset opening and closing timing. In the multifuel internal combustion engine of the first embodiment, the intake valve 31 is opened and closed in synchronization with rotation of the crankshaft 15.

The multifuel internal combustion engine may include a variable valve mechanism such as a so-called variable valve timing and lift mechanism which can vary the opening and closing timing and the lift amount of the intake valve 31. With this, the opening and closing timing and the lift amount of the intake valve 31 can be varied to appropriate values suitable for a driving condition. In the multifuel internal combustion engine, a so-called electromagnetic drive valve which opens and closes the intake valve 31 utilizing electromagnetic force may be used to obtain the same effect as that of the variable valve mechanism.

Next, the fuel supply device 50 will be explained. The fuel supply device 50 introduces two or more kinds of fuel having different properties into the combustion chamber CC, and includes at least single low boiling point component fuel as one of the fuel to be supplied. According to the fuel supply device 50 of the first embodiment, two or more kinds of fuel (mixed fuel) stored in one fuel tank 41 in its mixed state are injected into a port, and this is sent into the combustion chamber CC together with the sucked air. Here, gasoline fuel and alcohol fuel as the single low boiling point component fuel are mixed and stored in the fuel tank 41 of the first embodiment. That is, the multifuel internal combustion engine is driven using mixed fuel ("alcohol-mixed fuel", hereinafter) of gasoline fuel and alcohol fuel in the fuel tank 41.

The fuel supply device 50 of the first embodiment includes a feed pump 53 which sends alcohol-mixed fuel sucked from the fuel tank 41 through a first fuel passage 51 into a second fuel passage 52, a delivery passage 54 which distributes alcohol-mixed fuel of the second fuel passage 52 into cylinders, and a fuel injection valve 55 provided in each cylinder for injecting the alcohol-mixed fuel supplied from the delivery passage 54 into the intake port 11b. The fuel supply device 50 makes fuel injection control means of the electronic control unit 1 drive and control the feed pump 53 and the fuel injection valve 55 in accordance with a driving condition. With this, the alcohol-mixed fuel is injected under fuel injection conditions such as a fuel injection amount, fuel injection timing and fuel injection period corresponding to the driving condition.

The alcohol-mixed fuel injected from the fuel injection valve 55 of the fuel supply device 50 is mixed with new air (intake air) in the intake port 11b and supplied to the combustion chamber CC as air-fuel mixture. The ignition timing control means of the electronic control unit 1 gives ignition instructions to a spark plug 61 shown in FIG. 1 at ignition timing suitable for the driving condition, ignites the air-fuel mixture to burn it. Gas in the cylinder (burnt gas) after the gas is burnt is discharged into an exhaust port 11c shown in FIG. 1 from the combustion chamber CC.

Here, an exhaust valve 71 which opens and closes an opening between the exhaust port 11c and the combustion chamber CC is disposed in the exhaust port 11c. The number of openings may be one or more, and the exhaust valve 71 is disposed in each of the opening. Therefore, in the multifuel internal combustion engine, burnt gas is discharged into the exhaust port 11c from the combustion chamber CC by opening the exhaust valve 71, and the discharge of the burnt gas into the exhaust port 11c is blocked by closing the exhaust valve 71. As the exhaust valve 71, for example, it is possible to use one having a variable valve mechanism such as a so-called variable valve timing and lift mechanism having a power transmission mechanism or a so-called electromagnetic drive valve.

In the fuel tank 41 of the first embodiment, evaporation gas of gasoline component and alcohol component is produced by evaporation of alcohol-mixed fuel. Thus, an evaporation gas purge apparatus is prepared in the multifuel internal combustion engine of the first embodiment as in the conventional technique. As shown in FIG. 1, the evaporation gas purge apparatus of the first embodiment includes an evaporation gas passage 42 which brings the fuel tank 41 and the intake passage 21 into communication with each other, a check valve 43 for preventing backflow of evaporation gas which flows from the fuel tank 41 into the evaporation gas passage 42, a canister 44 to which evaporation gas passing through the check valve 43 is adsorbed, and an on-off valve 45 which brings the evaporation gas passage 42 and the intake passage 21 into communication or shuts off the communication therebetween, thereby controlling the flow of the evaporation gas which is adsorbed to the canister 44.

The check valve 43 here is opened when a pressure in the fuel tank 41 exceeds a predetermined pressure and is closed when the pressure becomes lower than the predetermined pressure. The on-off valve 45 is opened and closed in accordance with instructions of the electronic control unit 1. The on-off valve 45 is opened when the purge control (supply control of evaporation gas to the intake passage 21) is executed, and is closed otherwise. A valve body of the on-off valve 45 may be moved to a fully-open state when a purge control condition is established, and an opening angle of the valve body may be varied continuously or stepwise in accordance with the purge control condition.

Therefore, in the evaporation gas purge apparatus, a pressure in the fuel tank 41 is increased as the evaporation gas is produced, and when the pressure exceeds the predetermined pressure, the check valve 43 is opened and the evaporation gas in the fuel tank 41 is introduced into the canister 44. Since the evaporation gas is adsorbed to the activate carbon in the canister 44, the purge control means of the electronic control unit 1 of the evaporation gas purge apparatus opens the on-off valve 45 which is in the opened state in accordance with the purge control condition (in accordance with a predetermined driving condition), and supplies the evaporation gas adsorbed to the canister 44 into the intake passage 21.

When the purge is controlled in this manner, the evaporation gas is mixed with new air (intake air) in the intake passage 21, and is also mixed with alcohol-mixed fuel injected from the fuel injection valve 55, and is supplied into the combustion chamber CC. That is, in the combustion chamber CC in this case, the air/fuel ratio is denser (richer) than the target air/fuel ratio (air/fuel ratio which is set at the time of combustion control in accordance with the driving condition) by the evaporation gas. Therefore, the fuel injection control means of the electronic control unit 1 usually performs control such that the fuel injection amount from the fuel injection valve 55 is reduced by the evaporation gas, and the air/fuel ratio in the combustion chamber CC becomes equal to the target air/fuel ratio.

Generally, in the internal combustion engine, gas in the combustion chamber CC leaks out into a crankcase through a gap between the piston 13 (strictly, piston rings 16a to 16c) and a wall surface of the cylinder bore 12a. The leaked gas is unburnt mixture or product after combustion, and is usually called blow-by gas. Here, a portion of the blow-by gas is mixed into lubricant oil in an oil pan 17 and remaining blow-by gas is stored in the crankcase. If a large amount of blow-by gas is stored in the crankcase, this hinders action of the piston 13 and thus, this is not preferable. Thus, the internal combustion engine is usually provided with a blow-by gas reducing device which discharges blow-by gas in the crankcase and recirculates the blow-by gas through an intake path.

In the multifuel internal combustion engine of the first embodiment, for example, unburnt mixture of the alcohol-mixed fuel and product after combustion such as HC and CO exist as blow-by gas in the crankcase (formed by a lower portion of the cylinder block 12 and an upper portion of the oil pan 17). In the first embodiment, the blow-by gas reducing device includes a passage (not shown) of the cylinder block 12 and the cylinder head 11 which is in communication in the crankcase, a blow-by gas passage 81 which brings the passage of the cylinder head 11 and the intake passage 21 into communication with each other, and a blow-by gas control valve 82 disposed between the blow-by gas passage 81 and the intake passage 21. According to the blow-by gas control valve 82, for example, an amount of blow-by gas flowing into the intake passage 21 may be adjusted in accordance with intake negative pressure.

The blow-by gas supplied by the blow-by gas reducing device is mixed with new air (intake air) in the intake passage 21, and is also mixed with alcohol-mixed fuel injected from the fuel injection valve 55, and is also mixed with evaporation gas when the purge control is executed and in this state, the blow-by gas is supplied to the combustion chamber CC. Therefore, in the combustion chamber CC at that time, the air/fuel ratio is denser (richer) than the target air/fuel ratio by the blow-by gas. Especially when the purge control is also executed, the air/fuel ratio is changed to denser side. Thus, the fuel injection control means of the electronic control unit 1 reduces the fuel injection amount from the fuel injection valve 55 so that the air/fuel ratio in the combustion chamber CC becomes equal to the target air/fuel ratio.

A portion of the blow-by gas in the crankcase is mixed with lubricant oil in the oil pan 17 as described above. Not only the lubricant oil but also alcohol-mixed fuel is adhered to the wall surface of the cylinder bore 12a in some cases, the lubricant oil on the wall surface is scrapped down by the piston rings 16a to 16c together with the alcohol-mixed fuel on the wall surface, and is returned into the lubricant oil in the oil pan 17. That is, the lubricant oil in the oil pan 17 is diluted mainly with alcohol-mixed fuel.

The alcohol fuel is single low boiling point component fuel having lower boiling point and higher evaporativity than that of other fuel (such as gasoline fuel). Therefore, in the alcohol component of the alcohol-mixed fuel mixed in the lubricant oil in the oil pan 17, the temperature of the lubricant oil increases and it evaporates at a dash when the temperature thereof reaches the boiling point of the alcohol fuel, and it goes out into the crankcase as shown in FIG. 2. On the other hand, in the lubricant oil, the gasoline component of the alcohol-mixed fuel mixed therein is gradually evaporated as the temperature thereof is increased as shown in FIG. 2 and only heavy component remains. That is, the alcohol-mixed fuel mixed in the lubricant oil is prone to be evaporated by temperature increase of the lubricant oil as compared with the gasoline fuel. FIG. 2 shows a relation between temperatures of the gasoline fuel and alcohol fuel mixed in the lubricant oil, and a distillation ratio (ratio evaporated from lubricant oil) from the lubricant oil of the gasoline fuel and alcohol fuel. Most of the alcohol fuel which evaporated at a dash (also called "evaporated alcohol fuel") is supplied into the intake passage 21 together with the blow-by gas and then sent into the combustion chamber CC, a portion of the alcohol fuel passes through a gap between the piston 13 and the wall surface of the cylinder bore 12a and is sent to the combustion chamber CC. Therefore, the fuel injection control means of the electronic control unit 1 monitors the temperature of the lubricant oil in the oil pan 17, and when the temperature thereof reaches a predetermined temperature region where the alcohol fuel is evaporated (close to the boiling point of alcohol fuel), the fuel injection amount from the fuel injection valve 55 must further be reduced such that the air/fuel ratio in the combustion chamber CC becomes equal to the target air/fuel ratio.

However, the air/fuel ratio in the combustion chamber CC becomes extremely denser (richer) (when alcohol fuel is evaporated when the mixing amount of the alcohol fuel into the lubricant oil in the oil pan 17 is high, when alcohol fuel is evaporated when evaporation gas and blow-by gas are supplied to the intake passage 21, or the like), even if the fuel injection amount is reduced to the minimum fuel injection amount of the fuel injection valve 55, there is a possibility that the air/fuel ratio in the combustion chamber CC cannot become equal to the target air/fuel ratio. That is, in such a case, there is a possibility that a fuel injection amount required for bringing the air/fuel ratio in the combustion chamber CC equal to the target air/fuel ratio is smaller than the minimum fuel injection amount of the fuel injection valve 55. Therefore, there is an adverse possibility that the actual air/fuel ratio in the combustion chamber CC becomes denser (richer) than the target air/fuel ratio, and exhaust emission or drivability is deteriorated.

Hence, in the multifuel internal combustion engine of the first embodiment, the purge control means of the electronic control unit 1 is constituted such that the purge control is prohibited when a temperature To of the lubricant oil in the oil pan 17 enters a predetermined purge control prohibiting temperature region ($Tav-\alpha \leq To < Tav+\beta$). Here, "Tav" is a boiling point temperature of alcohol fuel constituting the alcohol-mixed fuel. Further, "$\alpha$" and "$\beta$" represent temperature regions near the boiling point temperature Tav where there is a possibility that alcohol fuel is evaporated from lubricant oil, and are temperature region correction values for taking an error of the boiling point temperature of the actual alcohol fuel with respect to a theoretical boiling point temperature Tav into consideration. These temperature region correction values $\alpha$ and $\beta$ may be the same or different from each other, and they are obtained by previously conducting experiment or simulation.

If the temperature To of the lubricant oil becomes sufficiently higher than the boiling point temperature Tav, it can generally be estimated that the combustion temperature in the combustion chamber CC becomes extremely high due to abnormal combustion. Therefore, the temperature in the combustion chamber CC can be lowered by dense mixture. Thus, the upper limit "$Tav+\beta$" is set for the predetermined purge control prohibiting temperature region.

In the multifuel internal combustion engine of the first temperature, lubricant-oil temperature detecting means which detects the temperature To of lubricant oil in the oil pan 17 is provided. An oil temperature sensor 91 shown in FIG. 1 for directly detecting the temperature To of lubricant oil is prepared as lubricant-oil temperature detecting means.

One example of operation of the multifuel internal combustion engine of the first embodiment will be explained based on the flowchart in FIG. 3.

First, a temperature To of lubricant oil in the oil pan 17 is input to the electronic control unit 1 of the first embodiment (step ST5). The temperature To is detected based on a detection signal of the lubricant-oil temperature detecting means (oil temperature sensor 91).

The purge control means of the electronic control unit 1 determines whether the temperature To of lubricant oil in the oil pan 17 is within a predetermined purge control prohibiting temperature region ($Tav-\alpha \leq To < Tav+\beta$) (step ST10).

If the temperature To of lubricant oil is not within the predetermined purge control prohibiting temperature region, the purge control means once complete this processing. With this, in the multifuel internal combustion engine at that time, when a control condition which is required to execute the purge control is established, the purge control means instructs the evaporation gas purge apparatus to execute the purge control. Therefore, the purge control means at that time holds the valve body of the on-off valve 45 of the evaporation gas purge apparatus in its fully opened state, or if the on-off valve 45 is already closed, the purge control means fully opens the on-off valve 45, and supplies evaporation gas adsorbed to the canister 44 to the intake passage 21 as conventional means.

The purge control means sets a purge control prohibiting flag or the like if the temperature To of lubricant oil is within a predetermined purge control prohibiting temperature region, and prohibits the purge control (step ST15). With this, even if the control condition which is required to execute the purge control is established in the multifuel internal combustion engine at that time, the purge control instruction by the purge control means is not executed. That is, the purge control means at that time holds the valve body of the on-off valve 45 of the evaporation gas purge apparatus in its fully opened state, or if the on-off valve 45 is opened, the purge control means fully closes the on-off valve 45 so that the evaporation gas adsorbed by the canister 44 is not supplied to the intake passage 21. Therefore, the fuel injection control means of the electronic control unit 1 at that time may reduce the fuel injection amount from the fuel injection valve 55 while taking only the blow-by gas sent to the combustion chamber CC and the increased amount of evaporated alcohol fuel into consideration. With this, the actual air/fuel ratio in the combustion chamber CC can be equal to the target air/fuel ratio. Therefore, the multifuel internal combustion engine of the first embodiment can be operated excellently in accordance with the driving condition at that time. As compared with the conventional technique, the multifuel internal combustion engine prohibits the purge control so that the actual air/fuel ratio in the combustion chamber CC does not become denser (richer) than the target air/fuel ratio. Therefore, the engine is driven excellently while suppressing the deterioration in exhaust emission performance and drivability.

Even if the purge control is prohibited, the production of evaporation gas is not stopped in the fuel tank 41. Thus, in the evaporation gas purge apparatus, even if the evaporation gas is produced when the purge control is prohibited, the evaporation gas is adsorbed to the activated carbon in the canister 44. However, there is a limitation in absorbing amount of evaporation gas of the canister 44, and it is not possible to keep adsorbing the evaporation gas without limitation. Hence, the evaporation gas purge apparatus of the first embodiment repeats a short trip or the like when the canister 44 is brought into saturation (state where the evaporation gas cannot be adsorbed to the activated carbon any more), and excessive evaporation gas is released to the atmosphere.

In the first embodiment, the lubricant-oil temperature detecting means (oil temperature sensor 91) detects the temperature To of lubricant oil in the oil pan 17, but it is not always necessary that the lubricant-oil temperature detecting means directly detects the temperature To. For example, the temperature To of lubricant oil may be estimated utilizing the temperature of cooling water detected by a water temperature sensor 92. In this case, the electronic control unit 1 is provided with lubricant-oil temperature estimating means, and the temperature To of lubricant oil may be estimated using map data of a corresponding relation between the temperature of cooling water and the temperature To of the lubricant oil. Even if the temperature To of lubricant oil is estimated in this manner, the multifuel internal combustion engine in this case can be operated excellently as described above.

Second Embodiment

Figure 4:
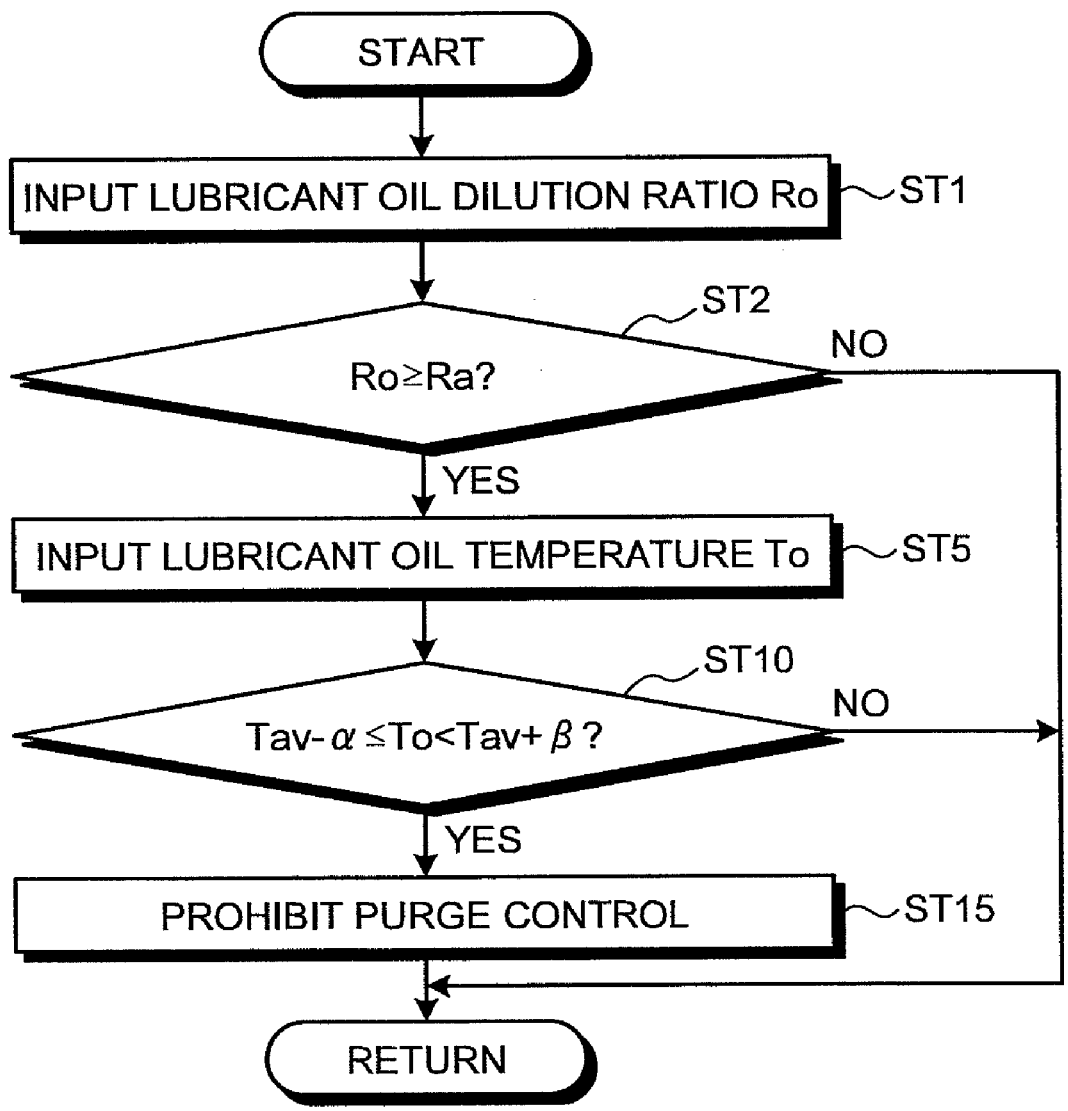
FIG. 4 is a flowchart used for explaining purge control prohibiting operation of the multifuel internal combustion engine in a second embodiment.

A second embodiment of the multifuel internal combustion engine according to the present invention will be explained based on FIGS. 1 and 4.

In the multifuel internal combustion engine of the first embodiment, if the temperature To of the lubricant oil in the oil pan 17 is within the purge control prohibiting temperature region (Tav−α≦To<Tav+β), the purge control is prohibited irrespective of other factor.

However, the same amount of alcohol fuel (single low boiling point component fuel) is not always mixed in the lubricant oil in the oil pan 17 and it is not preferable to always prohibit the purge control only based on the temperature To of the lubricant oil. That is, when the amount of alcohol fuel mixed in the lubricant oil is small, the amount of alcohol fuel evaporated from the lubricant oil is also small. Therefore, if the purge control is not executed and evaporation gas is not supplied to the combustion chamber CC when high purge flow rate is required in the driving condition, the actual air/fuel ratio in the combustion chamber CC becomes largely leaner than the target air/fuel ratio, there is a possibility that combustion failure is caused, knocking is generated and engine cannot be operated excellently in accordance with the driving condition. In the multifuel internal combustion engine of the first embodiment, the target air/fuel ratio can be achieved by increasing the fuel injection amount from the fuel injection valve 55 under such circumstances, but a fuel consumption performance is deteriorated on the other hand.

Hence, in the second embodiment, it is determined whether purge control is prohibited while also taking a mixing amount of single low boiling point component fuel (alcohol fuel) into the lubricant oil in the oil pan 17 account. More specifically, according to the multifuel internal combustion engine of the second embodiment, in the multifuel internal combustion engine of the first embodiment, a lubricant-oil dilution ratio detecting means which detects a dilution ratio ("lubricant-oil dilution ratio", hereinafter) Ro of the lubricant oil by the single low boiling point component fuel (alcohol fuel) is prepared, and the purge control means of the electronic control unit 1 is constituted such that when the lubricant-oil dilution ratio Ro does not exceed a predetermined value (predetermined dilution ratio) Ra, the purge control is not prohibited.

Here, as the lubricant-oil dilution ratio detecting means in the second embodiment, for example, an alcohol concentration sensor 93 shown in FIG. 1 which detects the alcohol concentration in lubricant oil in the oil pan 17 can be utilized. As the predetermined value (predetermined dilution ratio) Ra, it is only necessary to set such a lubricant-oil dilution ratio that even if alcohol fuel evaporated from the lubricant oil is supplied to the combustion chamber CC, the air/fuel ratio is not largely varied (i.e., the engine performance such as engine output and exhaust emission performance is not deteriorated). The predetermined value Ra is previously obtained by carrying out experiment or simulation.

One example of the operation of the multifuel internal combustion engine of the second embodiment will be explained based on the flowchart in FIG. 4.

First, a lubricant-oil dilution ratio Ro of lubricant oil in the oil pan 17 is input to the electronic control unit 1 of the second embodiment (step ST1). The lubricant-oil dilution ratio Ro is detected based on a detection signal of the lubricant-oil dilution ratio detecting means (alcohol concentration sensor 93).

The purge control means of the electronic control unit 1 determines whether the lubricant-oil dilution ratio Ro is equal to or higher than a predetermined value Ra, i.e., whether the alcohol fuel mixed in the lubricant oil in the oil pan 17 has such an amount that the purge control should be prohibited (step ST2).

Here, when the purge control means determines that it is unnecessary to prohibit the purge control because the lubricant-oil dilution ratio Ro is smaller than the predetermined value Ra, this processing is once completed. With this, in the multifuel internal combustion engine when this determination is made, the purge control is executed by the purge control means even if the temperature To of the lubricant oil falls within the predetermined purge control prohibiting temperature region (Tav−α≦To<Tav+β) when a control condition in which it is necessary to execute the purge control is established. Therefore, in the multifuel internal combustion engine at that time, the target air/fuel ratio can be achieved even if the fuel injection amount from the fuel injection valve 55 is not largely increased. That is, according to the multifuel internal combustion engine at that time, a purge flow rate that is sufficient to satisfy the target air/fuel ratio suitable for a driving condition can be secured any time when necessary. Therefore, the actual air/fuel ratio can become equal to the target air/fuel ratio without depending on increasing the fuel injection amount from the fuel injection valve 55. With this, according to the multifuel internal combustion engine at that time, it is possible to avoid the driving in a state where the air/fuel ratio is leaner than the target air/fuel ratio. Thus, it is possible to prevent combustion failure and to suppress the generation of knocking. Therefore, in the multifuel internal combustion engine at that time, it is possible to drive the engine excellently suitable for the driving condition without deteriorating a fuel consumption performance.

When the purge control means determines that the lubricant-oil dilution ratio Ro is equal to or higher than the predetermined value Ra, the temperature To of lubricant oil in the oil pan 17 detected or estimated like the first embodiment is input to the electronic control unit 1 of the second embodiment (step ST5).

Like the first embodiment, in the second embodiment, the purge control means determines whether the temperature To of lubricant oil in the oil pan 17 is within the predetermined purge control prohibiting temperature region (Tav−α≦To<Tav+β) (step ST10). If determined negatively, this processing is once completed. If determined affirmatively, the purge control is prohibited (step ST15).

That is, in the multifuel internal combustion engine of the second embodiment, the purge control is prohibited for the first time when the lubricant-oil dilution ratio Ro of lubricant oil in the oil pan 17 is equal to or higher than the predetermined value Ra and the temperature To of lubricant oil falls within the predetermined purge control prohibiting temperature region (Tav−α≦To<Tav+β). In the multifuel internal combustion engine at that time, like the first embodiment, the fuel injection amount from the fuel injection valve 55 is reduced while taking only increase in blow-by gas sent to the combustion chamber CC and evaporated alcohol fuel into account. With this, the actual air/fuel ratio in the combustion chamber CC is made equal to the target air/fuel ratio and the engine is operated excellently in accordance with the driving condition. Thus, in the multifuel internal combustion engine at that time, driving on the denser (richer) side than the target air/fuel ratio can be avoided, therefore, deterioration of exhaust emission performance and drivability is suppressed and excellent driving can be carried out.

As described above, according to the multifuel internal combustion engine of the second embodiment, when the amount of single low boiling point component fuel (alcohol fuel) mixed in lubricant oil in the oil pan 17 is small, since the amount of evaporated alcohol fuel is small even if the temperature To of lubricant oil is increased, if it is necessary to control the purge, the purge control is executed to secure the purge flow rate irrespective of the temperature To of lubricant oil. When the amount of single low boiling point component fuel (alcohol fuel) mixed in the lubricant oil is high, on the other hand, since the amount of alcohol fuel is increased at a dash by increase in temperature To of lubricant oil, even if it is necessary to control the purge, the purge control is not executed. Therefore, according to the multifuel internal combustion engine of the second embodiment, it is possible to operate the engine excellently in accordance with the driving condition without being influenced by the mixing amount of the single low boiling point component fuel (alcohol fuel) into lubricant oil.

Although the lubricant-oil dilution ratio Ro in the oil pan 17 is detected by the lubricant-oil dilution ratio detecting means (alcohol concentration sensor 93) in the second embodiment, the lubricant-oil dilution ratio Ro need not always be detected directly by the lubricant-oil dilution ratio detecting means, and the lubricant-oil dilution ratio Ro may be estimated from the driving history. In this case, the electronic control unit 1 is provided with the lubricant-oil dilution ratio estimating means, and the lubricant-oil dilution ratio estimating means estimates the lubricant-oil dilution ratio Ro in the following manner. Even if the lubricant-oil dilution ratio Ro is estimated in this manner, the multifuel internal combustion engine can be operated excellently as described above.

When the engine is cold, alcohol component which is not burnt in the alcohol-mixed fuel injected from the fuel injection valve 55 is mixed in lubricant oil. Here, the expression "when the engine is cold" means that the temperature To of lubricant oil is lower than the lower limit "Tav−α" of the purge control prohibiting temperature region. Thus, a mixing amount of alcohol fuel into lubricant oil in the oil pan 17 is estimated based on a total value of the fuel injection amount from the fuel injection valve 55 when the engine is cold, and the lubricant-oil dilution ratio Ro can be estimated from the mixing mount. Here, the lubricant-oil dilution ratio Ro can be estimated using map data which shows a corresponding relation between the total value of the fuel injection amount when the engine is cold and the lubricant-oil dilution ratio Ro.

When the engine is warm, alcohol fuel mixed in lubricant oil is evaporated at a dash. Here, the expression "when the engine is warm" means that the temperature To of lubricant oil is equal to or higher than the lower limit "Tav−α" of the purge control prohibiting temperature region. Here, if the evaporated alcohol fuel is supplied to the combustion chamber CC, the actual air/fuel ratio is deviated from the target air/fuel ratio. Therefore, the evaporated alcohol fuel amount can be found if a difference between the target air/fuel ratio and the actual air/fuel ratio is found. As a result, the actual air/fuel ratio can be obtained by using a detection signal of an exhaust sensor 94 such as an $O_2$ sensor and an A/F sensor shown in FIG. 1. The mixing amount of alcohol fuel in lubricant oil in the oil pan 17 and the evaporation amount of alcohol fuel from the lubricant oil have a correlation. Therefore, the mixing amount of alcohol fuel can be found from the amount of the estimated evaporated alcohol fuel amount. Therefore, the lubricant-oil dilution ratio estimating means estimates an amount of evaporated alcohol fuel while monitoring a difference between the target air/fuel ratio and the actual air/fuel ratio, and the lubricant-oil dilution ratio Ro can be estimated from the amount of evaporated alcohol fuel. Here, the lubricant-oil dilution ratio Ro may be estimated using the map data showing the lubricant-oil dilution ratio Ro with respect to the difference between the target air/fuel ratio and the actual air/fuel ratio when the engine is warm. As the total fuel supply amount for satisfying the target air/fuel ratio at the time of the estimation, a fuel supply amount from which a supply amount of evaporated alcohol fuel to the combustion chamber CC is removed (a fuel injection amount of from the fuel injection valve 55, and a supply amount of evaporation gas and a supply amount of blow-by gas if necessary) is used.

The lubricant-oil dilution ratio estimating means can compare, with each other, air/fuel ratio correction amounts when the engine is cold and when the engine is warm under the same predetermined condition such as constant-speed driving, and can estimate the lubricant-oil dilution ratio Ro based on the difference between the air/fuel ratio correction amounts. That is, even when the actual air/fuel ratio is deviated from the target air/fuel ratio, the actual air/fuel ratio is not influenced by the evaporated alcohol fuel when the engine is cold. On the other hand, the actual air/fuel ratio is influenced by the evaporated alcohol fuel when the engine is warm, and the actual air/fuel ratio is deviated from the target air/fuel ratio. Therefore, if a difference between the air/fuel ratio correction amounts when the engine is cold and when the engine is warm under the same condition is monitored, the amount of evaporated alcohol fuel supplied to the combustion chamber CC can be estimated. Thus, it is possible to estimate the lubricant-oil dilution ratio Ro from the difference. Here, the lubricant-oil dilution ratio Ro may be estimated using map data representing the corresponding relation between the difference and the lubricant-oil dilution ratio Ro.

The lubricant-oil dilution ratio estimating means can compare, with each other, air/fuel ratio correction amounts of a low fuel injection amount region and a high fuel injection amount region under the same predetermined condition when the engine is warm, and estimate a lubricant-oil dilution ratio Ro based on the difference therebetween. The low fuel injection amount region is a region where the target air/fuel ratio cannot be achieved if a fuel injection amount from the fuel injection valve 55 is not reduced with respect to the high fuel injection amount region. On the other hand, the high fuel injection amount region is a region where evaporated alcohol fuel is not generated (i.e., alcohol fuel is not mixed in lubricant oil). The difference is obtained from the air/fuel ratio correction amounts when the temperature To of the lubricant oil is the same. That is, if the temperature is the same, the evaporation amount of the alcohol fuel from the lubricant oil is constant. Thus, if a difference between the air/fuel ratio correction amounts of the low fuel injection amount region and the high fuel injection amount region is monitored, the amount of evaporated alcohol fuel which is supplied to the combustion chamber CC in the low fuel injection amount can be estimated. Therefore, it is possible to estimate the lubricant-oil dilution ratio Ro from the difference between the air/fuel ratio correction amounts. The lubricant-oil dilution ratio Ro may be estimated using the map data representing the corresponding relation between the difference and the lubricant-oil dilution ratio Ro.

Third Embodiment

Figure 5:
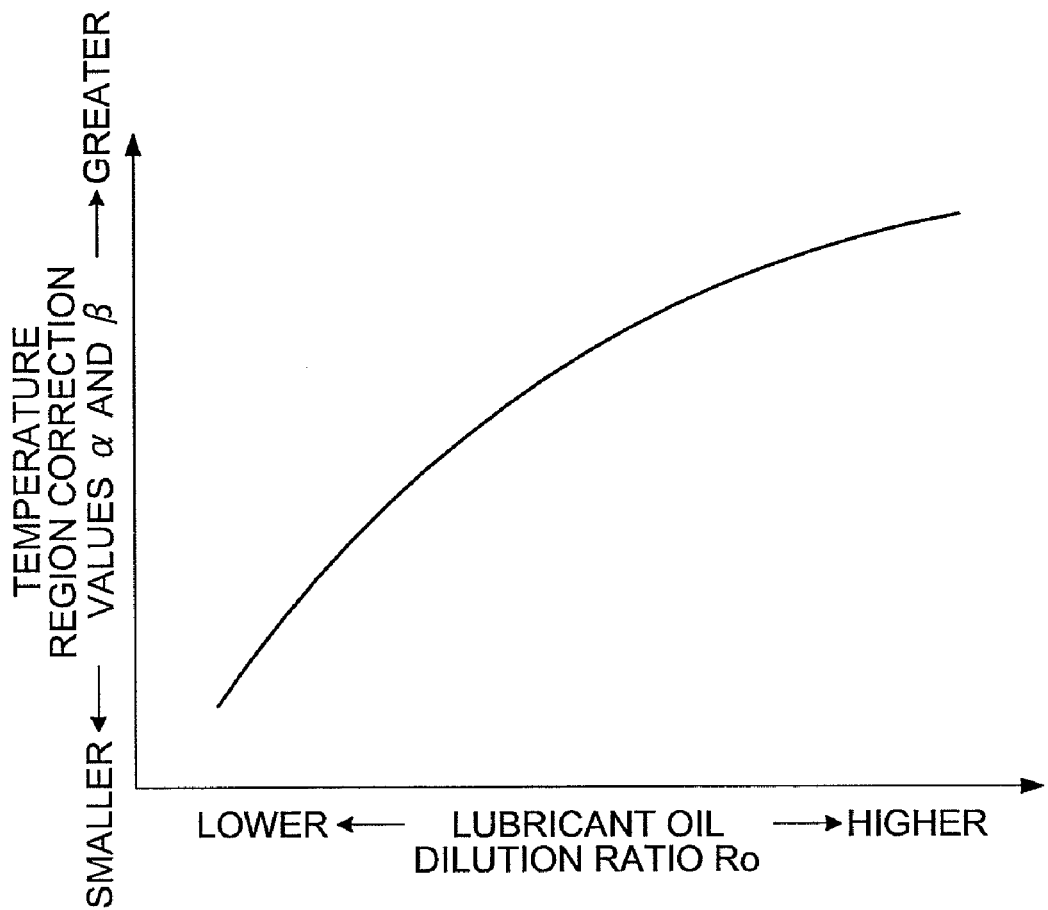
FIG. 5 is a diagram illustrating one example of map data for setting temperature region correction value in a third embodiment.

Next, a third embodiment of the multifuel internal combustion engine according to the present invention will be explained based on FIGS. 1, 5 and 6.

The multifuel internal combustion engine of the third embodiment is a modification of the multifuel internal combustion engine of the second embodiment, a mixing amount of the single low boiling point component fuel (alcohol fuel)

into lubricant oil in the oil pan 17 is taken into account, and it is determined whether the purge control should be prohibited.

More specifically, in the third embodiment, the detected or estimated lubricant-oil dilution ratio Ro is not compared with the predetermined value (predetermined dilution ratio) Ra, and the predetermined purge control prohibiting temperature region (Tav−α≦To<Tav+β) which is a determination threshold value of whether purge control should be prohibited is controlled in accordance with the lubricant-oil dilution ratio Ro.

Here, the purge control means of the electronic control unit 1 is constituted such that optimal temperature region correction values α and β are selected in accordance with the lubricant-oil dilution ratio Ro. The purge control means selects the temperature region correction values α and β using the map data for setting temperature region correction value shown in FIG. 5. The map data for setting temperature region correction value shown in FIG. 5 reduces the temperature region correction values α and β as the lubricant-oil dilution ratio Ro is lower, and increases the temperature region correction values α and β as the lubricant-oil dilution ratio Ro is higher. That is, when the lubricant-oil dilution ratio Ro is lower, since the evaporation amount of alcohol fuel from the lubricant oil is small even if the lubricant oil reaches the boiling point temperature Tav, the predetermined purge control prohibiting temperature region (Tav−α≦To<Tav+β) is narrowed so that the purge control is prohibited more than necessary and the actual air/fuel ratio is not deviated from the target air/fuel ratio. When the lubricant-oil dilution ratio Ro is higher, on the other hand, since the evaporation amount of alcohol fuel from the lubricant oil is increased when the lubricant oil reaches the boiling point temperature Tav, the predetermined purge control prohibiting temperature region (Tav−α≦To<Tav+β) is widened so that the purge control is executed at that time and the actual air/fuel ratio is not deviated from the target air/fuel ratio.

One example of operation of the multifuel internal combustion engine of the third embodiment will be explained based on the flowchart in FIG. 6.

First, lubricant-oil dilution ratio Ro of lubricant oil in the oil pan 17 detected or estimated in the same manner as that of the second embodiment is input to the electronic control unit 1 of the third embodiment (step ST1). Therefore, the purge control means of the electronic control unit 1 puts the lubricant-oil dilution ratio Ro into the map data for setting temperature region correction value shown in FIG. 5, and obtains the temperature region correction values α and β corresponding to the lubricant-oil dilution ratio Ro (step ST3).

The temperature To of lubricant oil in the oil pan 17 which is detected or estimated in the same manner as that of the first or second embodiment is input to the electronic control unit 1 of the third embodiment (step ST5).

The purge control means of the third embodiment substitutes the temperature region correction values α and β obtained in step ST3 into the predetermined purge control prohibiting temperature region (Tav−α≦To<Tav+β), optimizes the purge control prohibiting temperature region in accordance with the lubricant-oil dilution ratio Ro, and determines whether the temperature To of lubricant oil in step ST5 falls within the purge control prohibiting temperature region (step ST10). If determined negatively in step ST10, the purge control means once completes this processing as in the first and second embodiments, and if determined affirmatively, the purge control means prohibits the purge control (step ST15).

Therefore, according to the multifuel internal combustion engine of the third embodiment, if the lubricant-oil dilution ratio Ro is low, the predetermined purge control prohibiting temperature region (Tav−α≦To<Tav+β) is narrowed so that the purge control is not prohibited in a wider range more than necessary. Therefore, it is possible to prevent the air/fuel ratio from being leaned due to shortage of purge flow rate, and the engine can be operated excellently in accordance with the driving condition. According to the multifuel internal combustion engine, if the lubricant-oil dilution ratio Ro is high, the predetermined purge control prohibiting temperature region (Tav−α≦To<Tav+β) is widened and the purge control is prohibited in the wider range. Therefore, it is possible to prevent the air/fuel ratio from being increased due to excessive fuel, and the engine can be operated excellently in accordance with the driving condition. That is, according to the multifuel internal combustion engine of the third embodiment, like the multifuel internal combustion engine of the second embodiment, the engine can be operated excellently in accordance with the driving condition without being influenced by the mixing amount of single low boiling point component fuel (alcohol fuel) into lubricant oil in the oil pan 17.

In the first to third embodiments, the on-off valve 45 of the evaporation gas purge apparatus is operated toward its fully opened state or fully closed state. Therefore, when it is required to prohibit the purge control, the on-off valve 45 is fully closed. However, as shown in the explanation of the on-off valve 45, if the structure in which the open valve angle of the valve body is continuously or stepwisely varied is employed for the on-off valve 45, the purge control means may be constituted such that it is required to reduce the purge flow rate instead of prohibiting requirement of the purge control. For example, the purge control means in this case calculates the open valve angle of the valve body of the on-off valve 45 in accordance with one or both of the temperature To of lubricant oil and the lubricant-oil dilution ratio Ro (in other words, a reducing degree of purge flow rate), and drives and controls the on-off valve 45 such that such open valve angle is obtained. For example, the purge control means increases the open valve angle of the valve body of the on-off valve 45 (i.e., the reducing degree of the purge flow rate is increased) as the lubricant-oil dilution ratio Ro is higher. With this structure, the multifuel internal combustion engine can control the purge flow rate more finely as compared with the first to third embodiments and thus, the engine can be operated more excellently in accordance with the driving condition.

Although the so-called port injection type multifuel internal combustion engine which injects previously produced alcohol-mixed fuel into the intake port 11*b* has been described in the first to third embodiments, the technique for determining whether purge should be controlled explained in the first to third embodiments may be applied to another multifuel internal combustion engine, and with this also, the same effects as those of the first to third embodiments can be obtained. For example, this determining technique may be applied to a so-called cylinder-direct injection type multifuel internal combustion engine which injects alcohol-mixed fuel directly into the combustion chamber CC. The determining technique may be applied to a multifuel internal combustion engine which injects alcohol-mixed fuel to one or both of the intake port 11*b* and the combustion chamber CC in accordance with a driving condition. The determining technique may be applied to a multifuel internal combustion engine in which single low boiling point component fuel (alcohol fuel) and at least one kind of fuel having different properties are separately stored in fuel tanks, they are mixed with a desired mixing ratio in mid-course of a fuel supply path and then, they are introduced into the combustion chamber CC. Further, the determining technique may be applied to a multifuel internal combustion engine in which separately stored single low boiling point component fuel (alcohol fuel) and at least one kind of fuel having different properties are injected from respective special fuel injection valves, and they are respectively introduced into the combustion chamber CC.

INDUSTRIAL APPLICABILITY

The multifuel internal combustion engine according to the present invention is effective for a technique which realizes excellent driving even if single low boiling point component fuel is mixed in lubricant oil in the oil pan 17.

The invention claimed is:

1. A multifuel internal combustion engine in which single low boiling point component fuel and at least one kind of fuel having properties different from those of the single low boiling point component fuel are introduced into a combustion chamber separately or together thereby operating the multifuel internal combustion engine, comprising:
   lubricant-oil temperature detecting unit that detects a temperature of lubricant oil, or lubricant-oil temperature estimating unit that estimates the temperature; and
   purge control unit that prohibits purge control by an evaporation gas purge apparatus or reduces a purge flow rate of evaporation gas in the purge control, when the detected or estimated temperature of the lubricant oil is near a boiling point temperature of the single low boiling point component fuel at which it is necessary to reduce a fuel injection amount from a fuel injection valve to a predetermined amount or less to adjust an air/fuel ratio of the combustion chamber to a target air/fuel ratio.

2. The multifuel internal combustion engine according to claim 1, further comprising lubricant-oil dilution ratio detecting unit that detects a lubricant-oil dilution ratio of the lubricant oil by the single low boiling point component fuel, or lubricant-oil dilution ratio estimating unit that estimates the lubricant-oil dilution ratio, wherein
   the purge control unit prohibits the purge control in accordance with the detected or estimated lubricant-oil dilution ratio, or changes a reducing degree of a purge flow rate of evaporation gas in the purge control in accordance with the lubricant-oil dilution ratio.

3. The multifuel internal combustion engine according to claim 2, wherein the purge control unit prohibits the purge control as the lubricant-oil dilution ratio is higher, or increases a reducing degree of the purge flow rate of the evaporation gas in the purge control as the lubricant-oil dilution ratio is higher.

* * * * *